United States Patent
Lavi et al.

(10) Patent No.: US 9,078,125 B2
(45) Date of Patent: Jul. 7, 2015

(54) VEHICLE COMMUNICATIONS SYSTEM AND METHOD

(71) Applicant: GM Global Technology Operations LLC, Detroit, MI (US)

(72) Inventors: Nadav Lavi, Ramat-Hasharon (IL); Jonathan L. Gerlach, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 70 days.

(21) Appl. No.: 13/800,621

(22) Filed: Mar. 13, 2013

(65) Prior Publication Data

US 2014/0273952 A1    Sep. 18, 2014

(51) Int. Cl.
*H04M 1/66* (2006.01)
*H04W 12/02* (2009.01)
*H04L 29/06* (2006.01)
*H04L 29/08* (2006.01)

(52) U.S. Cl.
CPC ............ *H04W 12/02* (2013.01); *H04L 63/0435* (2013.01); *H04L 63/068* (2013.01); *H04L 67/12* (2013.01)

(58) Field of Classification Search
USPC .................... 340/431, 410, 411, 569.1, 569.2; 455/41.1–41.3, 410, 411, 569.1, 569.2; 726/27
See application file for complete search history.

(56) References Cited

U.S. PATENT DOCUMENTS

| | | | |
|---|---|---|---|
| 2003/0050009 A1* | 3/2003 | Kurisko et al. | 455/41 |
| 2006/0068760 A1* | 3/2006 | Hameed et al. | 455/412.1 |
| 2006/0089176 A1* | 4/2006 | Oki | 455/569.1 |
| 2008/0161047 A1* | 7/2008 | Witkowski et al. | 455/556.2 |
| 2008/0303648 A1* | 12/2008 | Day | 340/431 |
| 2011/0053575 A1* | 3/2011 | Veliu et al. | 455/418 |
| 2012/0028607 A1* | 2/2012 | Tengler et al. | 455/411 |
| 2013/0217330 A1* | 8/2013 | Gardenfors et al. | 455/41.2 |

FOREIGN PATENT DOCUMENTS

| | | |
|---|---|---|
| EP | 1575225 A2 | 9/2005 |
| WO | 2009042256 A2 | 4/2009 |

OTHER PUBLICATIONS

Wired vs wireless in the enterprise, retrieved from http://www.computerweekly.com/feature/Wired-vs-wireless-in-the-enterprise?vgnextfmt=print, dated Mar. 7, 2013.*
The German Patent and Trade Mark Office, Office Action for German Patent Application No. 10 2014 202 931.7 mailed May 13, 2014.

* cited by examiner

*Primary Examiner* — Daniel Lai
(74) *Attorney, Agent, or Firm* — Ingrassia Fisher & Lorenz, P.C.

(57) ABSTRACT

Methods and systems are provided for vehicle data communications. The system includes a vehicle communication component configured to receive data, encode the data to be transmitted, and transmit the encoded data wirelessly. A data delivery unit is configured to receive the encoded data, decode the encoded data, and present data in at least one format. A wired communication link couples the vehicle communication component and the data delivery unit. The wired communication link is configured to relay decoding information from the vehicle communication component to the data delivery unit such that the data delivery unit may decode the encoded data.

18 Claims, 4 Drawing Sheets

VEHICLE COMMUNICATIONS SYSTEM AND METHOD

TECHNICAL FIELD

The technical field generally relates to communications systems and methods for vehicles, and more particularly relates to wireless communication and methods for a vehicle.

BACKGROUND

Integration of wireless data communications in vehicles is becoming more widespread. Particularly, data from cellular networks may be used by "infotainment" units, e.g., vehicle radio and video units. Moreover, this same data may be used by individual devices, e.g., laptop computers, tablets, and so on.

One issue confronting such widespread wireless data communication is the unauthorized interception of such data, for example, snooping and hacking of data networks. Another issue is the prioritization of data such that important devices do not suffer due to lack of bandwidth to wirelessly deliver data when other devices are also using the wireless resources.

Accordingly, it is desirable to provide a system and method for reducing unauthorized interception of wireless data in vehicle communications systems. In addition, it is desirable to provide a system and method for prioritization of wireless data. Furthermore, other desirable features and characteristics of the present disclosure will become apparent from the subsequent detailed description and the appended claims, taken in conjunction with the accompanying drawings and the foregoing technical field and background.

SUMMARY

A communications system for a vehicle is provided. In one exemplary embodiment, the system includes a vehicle communication component. The vehicle communication component is configured to receive data, encode the data to be transmitted, and transmit the encoded data wirelessly. A data delivery unit is configured to receive the encoded data, decode the encoded data, and present data in at least one format. The system further includes a wired communication link coupling the vehicle communication component and the data delivery unit. The wired communication link is configured to relay decoding information from the vehicle communication component to the data delivery unit such that the data delivery unit may decode the encoded data.

A method is provided for vehicle data communications. In one exemplary embodiment, the method includes receiving data at a vehicle communication component of a vehicle. The method also includes encoding data at the vehicle communication component to generate encoded data. The encoded data is transmitted wirelessly from the vehicle communication component to a data delivery unit. The method further includes sharing decoding information via a wired communication link between the vehicle communication component to the data delivery unit. The method also includes decoding the encoded data at the data delivery unit using the decoding information.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Referring to the figures, wherein like numerals indicate like parts throughout the several views, a vehicle communications system 100 for a vehicle 102 and a method of vehicle data communications is shown and described herein. In the exemplary embodiments shown herein, the vehicle 102 is an automobile having an engine 103 for propelling the vehicle 102. However, in other embodiments, the vehicle communication system 100 may be implemented in other vehicles, e.g., an aircraft or a boat. Furthermore, the system 100 described herein may also be implemented in non-vehicle applications.

Figure 1:
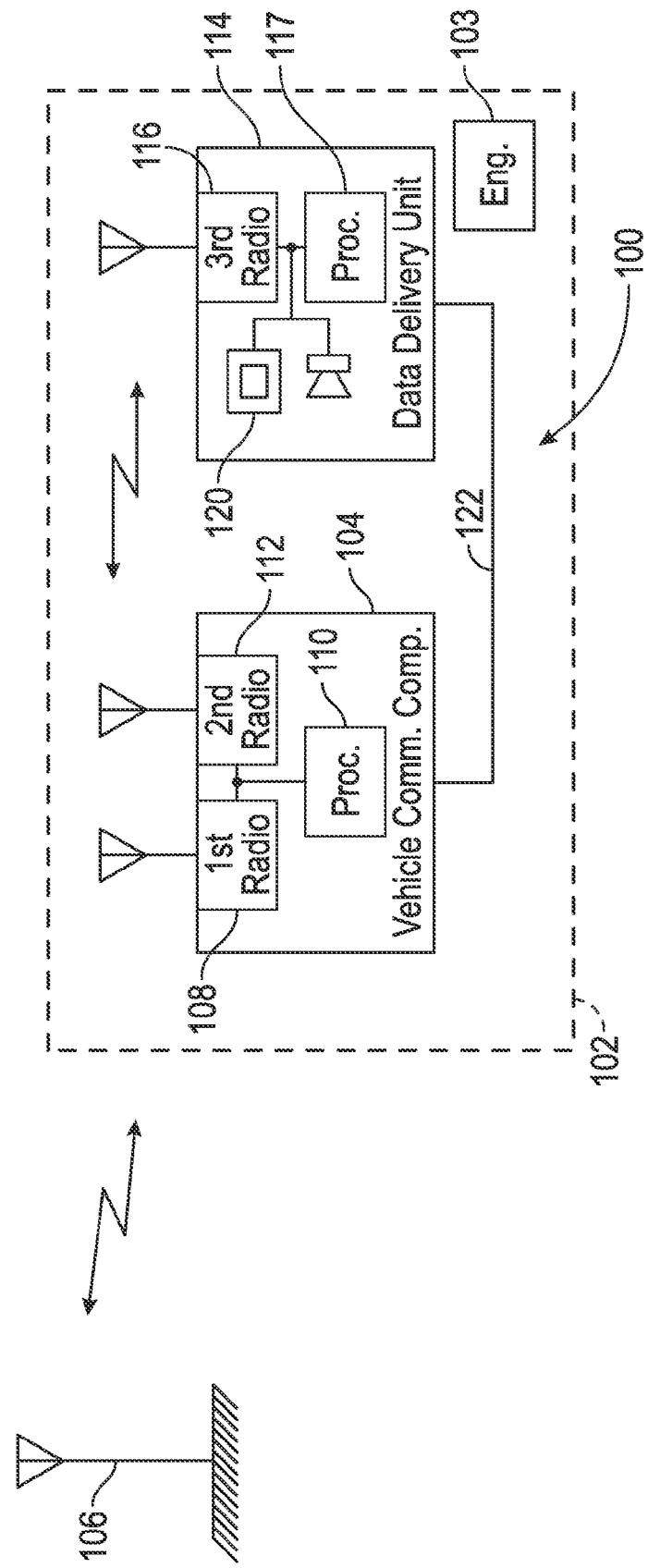
FIG. 1 is a block schematic diagram of a vehicle communications system in accordance with various embodiments.

Referring to FIG. 1, the system 100 includes a vehicle communication component 104. The vehicle communication component 104 is configured to receive data. In the exemplary embodiments, the data is transmitted wirelessly from a remote station 106. Specifically, the data is transmitted by modulating a radio frequency (RF) signal as is well known to those skilled in the art. For example, the remote station 106 may be part of a cellular network such as a 3GPP-LTE. However, other techniques for transmitting and receiving data may alternately be utilized. Furthermore, the remote station 106 may be a satellite transmitter (not shown) or other suitable device as recognized by those skilled in the art. In other embodiments, the data may be supplied from other sources.

More specifically, the vehicle communication component 104 includes a first radio 108 configured to receive data transmitted wirelessly from the remote station 106. The first radio 108 may also be configured to transmit data to the remote station 106 to achieve bi-directional communications. The data communicated between the remote station 106 and the vehicle communication component 104 may be used to carry voice, music, video, electronic mail, text messages, or any other information as is appreciated by those skilled in the art. As examples, the data may include an audio program, such as a radio broadcast, or a video program, such as a television show.

The vehicle communication component 104 is also configured to encode data resulting in the generation of encoded data. The data encoded by the vehicle communication component 104 may be data received by the first radio 108 from the remote station 106. Alternatively and/or additionally, the data encoded by the vehicle communication component 104 may be generated by the vehicle communication component 104 or received from other sources (not shown). More specifically, the vehicle communication component 104 of the exemplary embodiments includes at least one processor 110. The processor 110 may be a microprocessor, microcontroller, application specific integrated circuit ("ASIC"), or other device for performing arithmetic computations and/or executing instructions (i.e., a program). The processor 110 controls operation and communication within the vehicle communication component 104 as well as encoding the data to generate the encoded data.

The encoded data generated by the vehicle communication component 104 may be encrypted. A security key may be utilized to decrypt and decode the encoded data, as is appreciated by those skilled in the art. The security key may be a "password" or other arrangement of data that permits the encoded data to be decrypted and decoded.

The vehicle communication component 104 is further configured to transmit the encoded data wirelessly. More specifically, the vehicle communication component 104 of the exemplary embodiment includes a second radio 112. The second radio 112 is configured to transmit the encoded data by modulating an RF signal as is well known to those skilled in the art. Even more specifically, the second radio 112 of the exemplary embodiment transmits the data utilizing a Wi-Fi standard, i.e., one or more of the 802.11 standards as defined by the Institute of Electrical and Electronics Engineers ("IEEE"), as is well known to those skilled in the art. However, other techniques and standards for wirelessly transmitting the encoded data may be implemented as appreciated by those skilled in the art. Furthermore, the second radio 112 of the vehicle communication component 104 may also be configured to receive data wirelessly in addition to transmitting data.

In the exemplary embodiment shown in FIG. 1, the encoded data transmitted by the second radio 112 is identified with an identifier. More specifically, the encoded data is identified with a service set identification ("SSID") in accordance with the 802.11 standard. However, in other embodiments, other identifiers for the encoded data may be utilized.

The system 100 also includes a data delivery unit 114. The data delivery unit 114 is configured to receive the encoded data transmitted by the second radio 112 of the vehicle communication component 104. More specifically, the data delivery unit 114 includes a third radio 116 configured to receive the encoded data.

The data delivery unit 114 of the exemplary embodiment further includes at least one processor 117 to decode the encoded data. The processor 117 may be a microprocessor, microcontroller, ASIC, or other device for performing arithmetic computations and/or executing instructions (i.e., a program). The processor 117 controls operation and communication within the data delivery unit 114 as well as decoding the data.

The data delivery unit 114 is configured to present the data in at least one format. In one example, the data may be presented in an audible format by a loudspeaker 118. In another example, the data may be presented in a visual format by a display 120. In yet another example, the data may be presented in a combination of audible and visual formats.

The data delivery unit 114 may be alternatively referred to as an infotainment head unit ("IHU") or simply, an infotainment unit. Those skilled in the art appreciate that the IHU may also be referred to as a "stereo" system, a radio, and/or a video unit. The data delivery unit 114 may be located at any desired location within the vehicle 102 so as to communicate received data to one or more occupants of the vehicle, and further, the vehicle 102 could include more than one data delivery unit 114, if desired.

The system 100 further includes a wired communication link 122. The wired communication link 122 couples the vehicle communication component 104 and the data delivery unit 114. In some embodiments, the wired communication link 122 comprises one or more electrical conductors (not separately numbered), e.g., wires or cables, to transfer electrically-encoded signals. In other embodiments, the wired communication link 122 includes fiber optics to transfer optically-encoded signals.

The wired communications link 122 is configured to share decoding information between the vehicle communication component 104 and the data delivery unit 114. More specifically, in the exemplary embodiment, the wired communications link 122 relays decoding information from the vehicle communication component to the data delivery unit 114. The decoding information is utilized by the data delivery unit 114 to decode and/or decrypt the encoded data. In one embodiment, the decoding information may include the identifier described above. For example, the decoding information may be the SSID. In another embodiment, the decoding information may include the security key. In yet another embodiment, the decoding information may include the type of security and/or encryption protocols used. Of course, the decoding information may include more than one of the elements described above. Furthermore, other and additional decoding information may be relayed via the wired communications link 122.

By conveying the decoding information via the wired communications link 122, the operator of the vehicle is spared the time and effort to enter such decoding information to the data delivery unit 114. As such, decoding and/or decrypting of the encoded data sent to the data delivery unit 114 may be accomplished automatically. Furthermore, the conveyance of the decoding information via the wired communications link 122 is more secure than such information sent via wireless techniques, as interception of the decoding information is difficult for unauthorized users without physical connection to the system 100.

The vehicle communication component 104 may be further configured to change the decoding information necessary to decode the encoded data. This decoding information, now changed, is then transmitted via the wired communications link 122. In the exemplary embodiments, the vehicle communication component 104 is further configured to periodically change the decoding information necessary to decode the encoded data. This periodic change of the decoding information could be done in response to an event occurring. More specifically, in the exemplary embodiments, the decoding information is changed whenever the vehicle 102 is started, e.g., when an engine (not shown) of the vehicle 102 is started. The term "periodically", as used herein, should not necessarily be interpreted to mean "at a regular interval". However, it should be appreciated that the changing of the decoding information may occur at regular intervals, random intervals, based on any other interval, or based on the occurrence of an event.

The periodic changing of the decoding information further enhances security of the system 100 by increasing the difficulty of an unauthorized user to intercept data transmitted wirelessly from the vehicle communication component 104 to the data delivery unit 114. The periodic changes also makes it more difficult for an unauthorized user from transmitting data wirelessly to the vehicle communication component 104 and thus, to the remote station 106.

The wired communications link 122 may further be utilized to transmit data and/or other information from the data delivery unit 114 to the vehicle communication component 104. This data may include, but is certainly not limited to, an identification or address of the data delivery unit 114.

The vehicle communication component 104 is configured to transmit multiple groups of data that are distinguishable from one another. For instance, in the exemplary embodiment shown in FIG. 2, the vehicle communication component 104 is configured to transmit a first group 200 of encoded data to the data delivery unit 114 and to transmit a second group 202 of encoded data. The second group 202 of encoded data may be received by one or more user devices 204. These user devices 204 include, but are certainly not limited to, cellular phones, smartphones, tablets, and computers. Of course, other suitable user devices 204 will be appreciated by those skilled in the art.

The first and second groups 200, 202 of encoded data may be distinguished by different identifiers, e.g., different SSIDs. However, other techniques may be utilized to distinguish the first and second groups 200, 202. As just one example, the first group 200 of encoded data may be transmitted on one frequency while the second group 202 encoded data may be transmitted on another frequency.

The vehicle communication component 104 of the exemplary embodiment prioritizes the transmission of data to and from the data delivery unit 114, i.e., the first group of encoded data, over transmission of data to and from the user devices 204, i.e., the second group of encoded data. As such, interruption of data to the data delivery unit 114, e.g., audio and video programs, is reduced, providing a higher quality of service to the data delivery unit 114.

Figure 2:
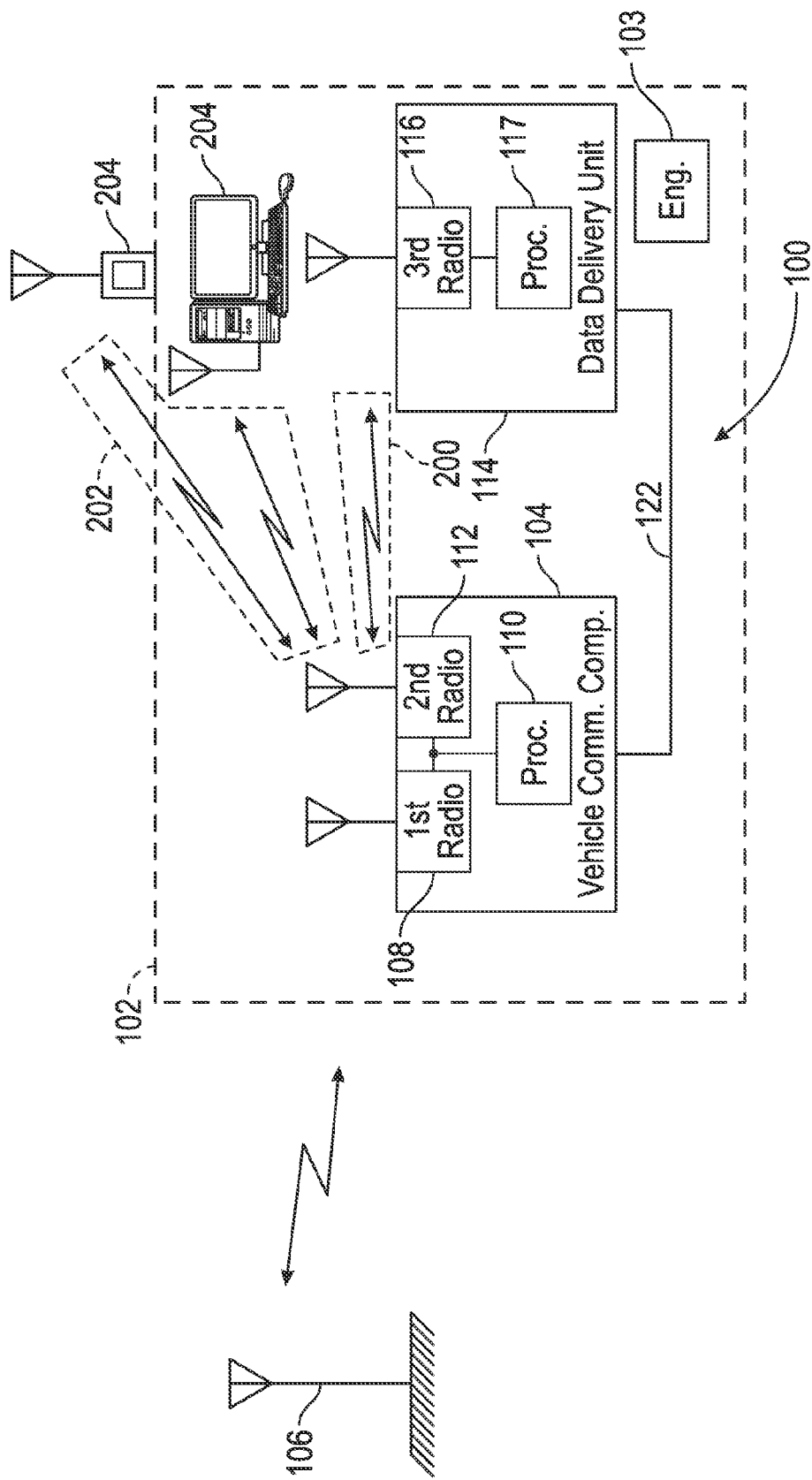
FIG. 2 is a block schematic diagram of the vehicle communications system showing encoded data being transmitted in a plurality of distinguishable groups in accordance with various embodiments.

In the exemplary embodiment of FIG. 2, a user of the vehicle 102 may manually configure, i.e., "set", the identifier of the second group 202 of encoded data. However, in this embodiment, the identifier of the first group is assigned by the vehicle communication component 104 via the wired communications link 122.

The vehicle communication component 104, or a portion thereof, need not be integral or permanent component of the vehicle 102. Instead, the vehicle communication component 104 may be a portable device. As just one example, the vehicle communication component 104 may be a smartphone (not separately shown) of an operator of the vehicle 102. In such an example, the wired communications link 122 may include a universal serial bus ("USB") cable. In another example, the first radio 108 of the vehicle communication component 104 may be implemented as a smartphone (not separately shown) of an operator of the vehicle 102, while the second radio 112 may be implemented as a separate component.

Figure 3:
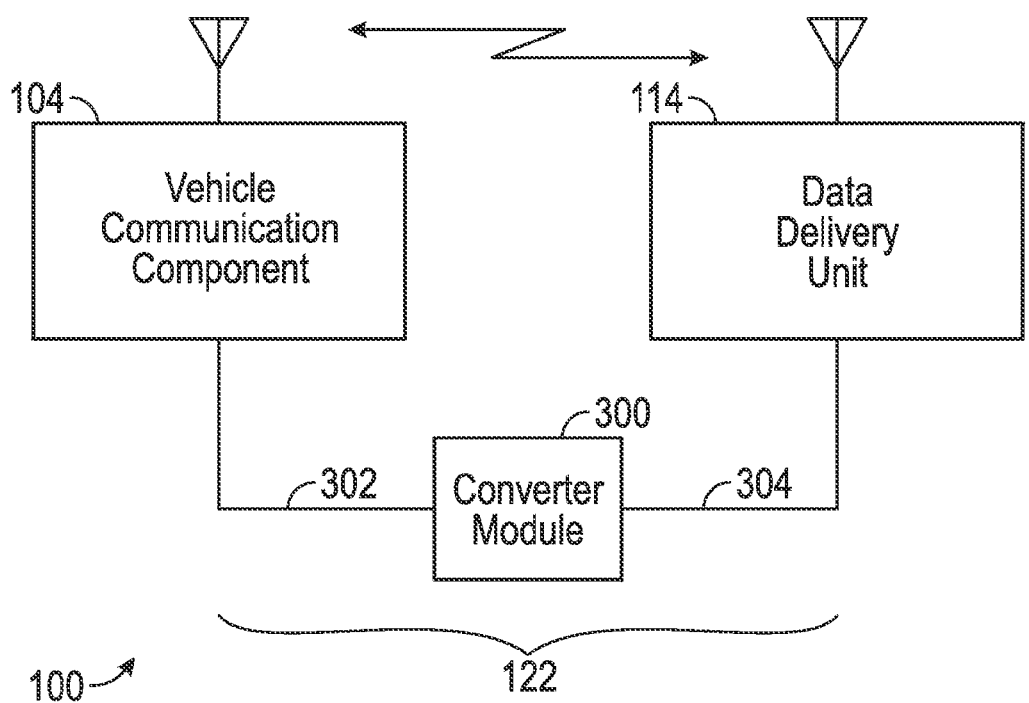
FIG. 3 is a block schematic diagram of the vehicle communications system showing a wired communications link having a converter in accordance with various embodiments.

The wired communications link 122 need not be a single, continuous connection between the vehicle communication component 104 and the data delivery unit 114. For instance, as shown in FIG. 3, the wired communications link 122 may include a converter module 300 coupled to a first link 302 and a second link 304. Such an embodiment is advantageous where the communications protocol and/or other characteristic of the vehicle communication component 104 differ from the communications protocol and/or other characteristic of the data delivery unit 114.

Figure 4:
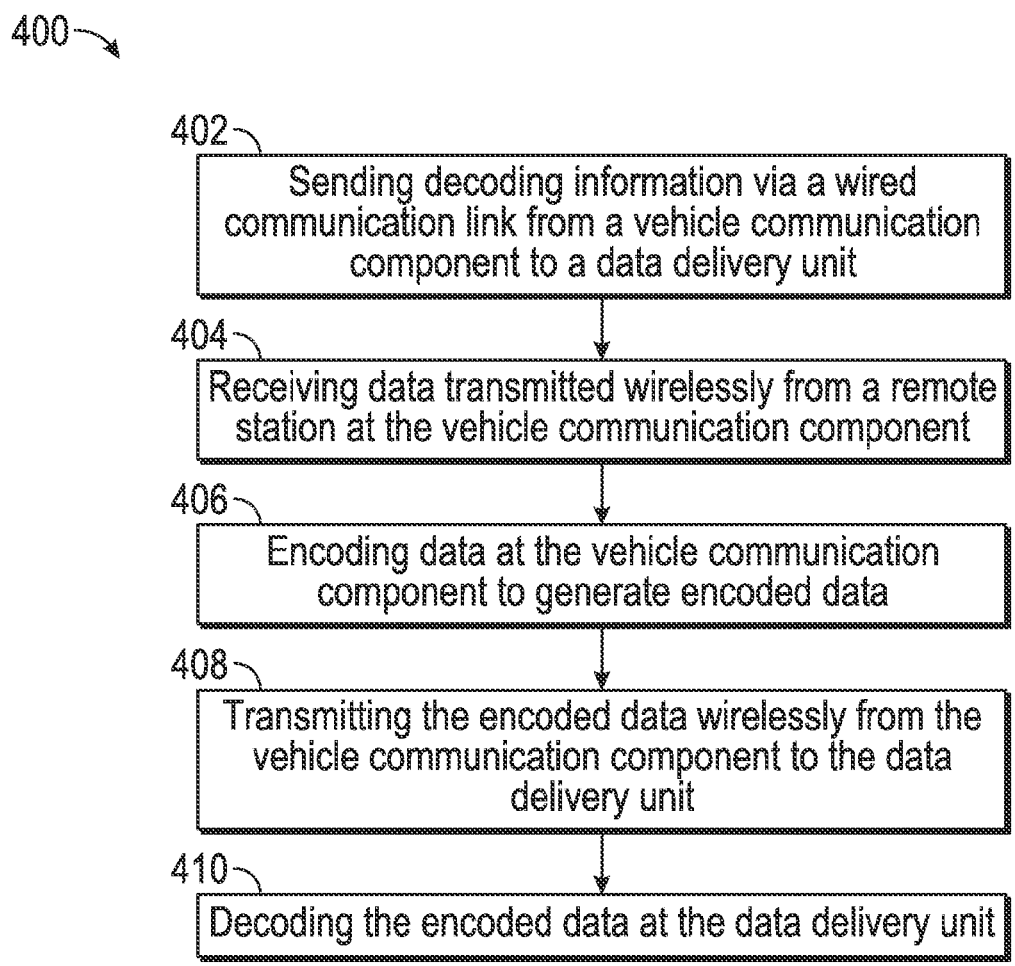
FIG. 4 is a flowchart diagram of a method of vehicle communications data in accordance with various embodiments.

A method of vehicle data communications is described above with respect to the vehicle communications system 100. One exemplary embodiment of the method 400, as shown in FIG. 4, includes the step 402 of sending decoding information via the wired communication link 122 from the vehicle communication component 104 to the data delivery unit 114. The method further includes the step 404 of receiving data transmitted wirelessly from the remote station 106 at the vehicle communication component 104 of the vehicle 102. The method 400 continues with the step 406 of encoding data at the vehicle communication component 104 to generate encoded data. The method 400 further includes the step 408 transmitting the encoded data wirelessly from the vehicle communication component 104 to the data delivery unit 114.

Once the encoded data has been received, the method 400 continues with the step 410 of decoding the encoded data at the data delivery unit 114.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of vehicle data communications, comprising:
   receiving data at a vehicle communication component of a vehicle;
   encoding the data at the vehicle communication component to generate encoded data;
   identifying a first group of the encoded data with a first identifier;
   identifying a second group of the encoded data with a second identifier;
   transmitting a first group of the encoded data wirelessly from the vehicle communication component to a data delivery unit;
   transmitting a second group of the encoded data wirelessly from the vehicle communication component to at least one user device;
   sharing decoding information via a wired communication link between the vehicle communication component to the data delivery unit; and
   decoding the encoded data at the data delivery unit using the decoding information.

2. A method as set forth in claim 1 further comprising changing the decoding information necessary to decode the encoded data.

3. A method as set forth in claim 2 wherein changing the decoding information is performed in response to an event.

4. A method as set forth in claim 1 wherein sharing decoding information is further defined as sending decoding information via the wired communication link from the vehicle communication component to the data delivery unit.

5. A method as set forth in claim 1 further comprising periodically changing the decoding information necessary to decode the first group of the encoded data.

6. A method as set forth in claim 1 wherein the decoding information comprises the first identifier.

7. A method as set forth in claim 1 wherein the decoding information comprises a security key.

8. A method as set forth in claim 1 wherein the vehicle communication component is further defined as a portable phone.

9. A method as set forth in claim 1 wherein receiving data at the vehicle communication component comprises receiving data transmitted wirelessly from a remote station at the vehicle communication component.

10. A communications system for a vehicle, comprising:
    a vehicle communication component configured to receive data, encode the data to be transmitted, identify a first group of the encoded data with a first identifier, identify a second group of the encoded data with a second identifier, and transmit the encoded data wirelessly;

a data delivery unit configured to receive the first group of encoded data, decode the first group of encoded data, and present data in at least one format; and a wired communication link coupling said vehicle communication component and said data delivery unit and configured to relay decoding information from said vehicle communication component to said data delivery unit such that said data delivery unit may decode the encoded data.

11. A system as set forth in claim 10 wherein said vehicle communication component is further configured to periodically change the decoding information necessary to decode the encoded data.

12. A system as set forth in claim 10 wherein said vehicle communication component comprises:
 a first radio configured to receive data transmitted wirelessly from a remote station; and
 a second radio in communication with said first radio and configured to receive data from said first radio, encode the data to generate encoded data, and transmit the encoded data wirelessly.

13. A system as set forth in claim 12 wherein said data delivery unit comprises a third radio configured to receive the encoded data wirelessly from said second radio.

14. A system as set forth in claim 10 wherein said vehicle communication component is further configured to transmit the first group of encoded data to the data delivery unit and to transmit the second group of encoded data to at least one user device.

15. A system as set forth in claim 10 wherein said data delivery unit comprises a loudspeaker configured to present the data in an audible format.

16. A system as set forth in claim 10 wherein said data delivery unit comprises a display configured to present the data in a visual format.

17. A vehicle, comprising:
 an engine for propelling said vehicle;
 a vehicle communication component including
  a first radio configured to receive data transmitted wirelessly from a remote station, and
  a second radio in communication with said first radio and configured to receive data from said first radio, encode the data to generate encoded data, identify a first group of the encoded data with a first identifier, identify a second group of the encoded data with a second identifier, and transmit the encoded data wirelessly;
 a data delivery unit including
  a third radio configured to receive the first group of encoded data and decode the encoded data utilizing decoding information, and
  a loudspeaker in communication with said third radio to present data in an audible format; and
 a wired communication link coupling said vehicle communication component and said data delivery unit and configured to relay decoding information from said vehicle communication component to said data delivery unit.

18. A vehicle as set forth in claim 17 wherein said vehicle communication component is further configured to change the decoding information necessary to decode the encoded data in response to a starting of said engine.

* * * * *